US009167611B2

(12) United States Patent
Breckman et al.

(10) Patent No.: US 9,167,611 B2
(45) Date of Patent: Oct. 20, 2015

(54) SYSTEM AND METHOD OF PEER-TO-PEER, PAIRED, AND SYNCHRONIZED NODES

(71) Applicants: Andrew Breckman, Madison, NJ (US); Agesino Primatic, Pittstown, NJ (US); Mark Slaughter, Far Hills, NJ (US); Ben Reytblat, Princeton Junction, NJ (US); David Berko, Princeton, NJ (US)

(72) Inventors: Andrew Breckman, Madison, NJ (US); Agesino Primatic, Pittstown, NJ (US); Mark Slaughter, Far Hills, NJ (US); Ben Reytblat, Princeton Junction, NJ (US); David Berko, Princeton, NJ (US)

(73) Assignee: Andrew Breckman, Madison, NJ (US)

( * ) Notice: Subject to any disclaimer, the term of this patent is extended or adjusted under 35 U.S.C. 154(b) by 0 days.

(21) Appl. No.: 14/208,341

(22) Filed: Mar. 13, 2014

(65) Prior Publication Data
US 2014/0273854 A1 Sep. 18, 2014

Related U.S. Application Data

(60) Provisional application No. 61/940,701, filed on Feb. 17, 2014, provisional application No. 61/909,542, filed on Nov. 27, 2013, provisional application No. 61/778,902, filed on Mar. 13, 2013.

(51) Int. Cl.
*H04B 7/00* (2006.01)
*H04W 76/02* (2009.01)
*H04W 8/00* (2009.01)
*H04W 4/00* (2009.01)

(52) U.S. Cl.
CPC ............ *H04W 76/021* (2013.01); *H04W 8/005* (2013.01); *H04W 4/008* (2013.01)

(58) Field of Classification Search
CPC ..... H04W 84/18; H04W 88/06; H04W 76/02; H04W 4/08; H04W 88/02; H04M 1/7253; H04M 1/72519; H04M 1/72522
USPC ............. 455/41.2, 418, 422.1, 456.1, 456.2, 455/550.1, 551, 552.1, 553.1
See application file for complete search history.

(56) References Cited

U.S. PATENT DOCUMENTS 7,551,593 B2 * 6/2009 Haller et al. .................. 370/338
7,769,370 B2 8/2010 Du Breuil et al.
(Continued)

FOREIGN PATENT DOCUMENTS

| WO | 2009018252 | 2/2009 |
| WO | 2011026097 | 3/2011 |
| WO | WO2013/021209 | 2/2013 |

OTHER PUBLICATIONS

International Search Report for PCT Application No. PCT/US/2014/025722 Mailed Sep. 11, 2014. 8 Pages.

*Primary Examiner* — Nhan Le
(74) *Attorney, Agent, or Firm* — Gearhart Law, LLC

(57) ABSTRACT

The present disclosure provides for a method of pairing wireless devices as well as wireless devices employing the pairing methodology. The wireless devices each possess individual identifiers. The individual identifiers comprise a 64 bit number. Each device also possesses a number of selection indicator identifiers. The selection indicator identifier is a preferably a color comprising a 24 bit number. The individual identifier and selection indicator identifier are combined using a hash function to create a 32 bit hash group identification. A simultaneous holding of buttons on the wireless devices creates the pairing between the devices and stores the 32 bit hash group identification in the device's memory. When two unpaired devices sharing a group identification number are brought within a predetermined proximity to one another, the devices automatically pair.

11 Claims, 9 Drawing Sheets

(56) References Cited

U.S. PATENT DOCUMENTS

| | | |
|---|---|---|
| 8,219,135 B2 | 7/2012 | De Amorim et al. |
| 8,325,020 B2 | 12/2012 | Izadi et al. |
| 8,346,979 B1 | 1/2013 | Lee |
| 8,365,301 B2 | 1/2013 | Miller |
| 8,416,085 B2 | 4/2013 | Gawlick |
| 8,437,474 B2 | 5/2013 | Zheng et al. |
| 8,499,158 B2 | 7/2013 | Lee et al. |
| 8,521,086 B2 | 8/2013 | Bradley |
| 8,798,544 B2 * | 8/2014 | Rothschild .................. 455/41.2 |
| 8,996,053 B2 * | 3/2015 | Wiatrowski .................. 455/517 |
| 2006/0061482 A1 | 3/2006 | Monney et al. |
| 2008/0146265 A1 | 6/2008 | Valavi |
| 2010/0203829 A1 | 8/2010 | Granqvist et al. |
| 2011/0029692 A1 | 2/2011 | Chassot et al. |
| 2012/0083209 A1 | 4/2012 | Giles et al. |
| 2012/0154147 A1 | 6/2012 | Cao et al. |
| 2012/0221634 A1 | 8/2012 | Treu et al. |
| 2014/0134951 A1 * | 5/2014 | Paulson ...................... 455/41.2 |

* cited by examiner

SYSTEM AND METHOD OF PEER-TO-PEER, PAIRED, AND SYNCHRONIZED NODES

CLAIM OF PRIORITY

This application claims the priority of U.S. Ser. No. 61/778,902 filed on Mar. 13, 2013. This application also claims the priority of U.S. Ser. No. 61/909,542 filed on Nov. 27, 2013 and U.S. Ser. No. 61/940,701 filed on Feb. 17, 2014, the contents of which are fully incorporated herein by reference.

FIELD OF THE INVENTION

The present invention relates to methods and a system of pairing and synchronizing a number of wireless devices, namely using distinct and common identifiers between the wireless devices to achieve such a pairing and subsequent synchronization. In particular, using hash functions to create a group of wireless devices that permits automatic pairing with another wireless device possessing the same identifier as the group.

BACKGROUND OF THE INVENTION

Wireless technology permits different devices to communicate without being hard wired to one another. Most notably, this ability has manifested itself in wireless internet and other data communications systems. Presently, there are a number of different wireless protocol stacks including Bluetooth®, ANT, Wi-Fi, and ZigBee which all operate in the 2.4 GHz industrial, scientific, and medical (ISM) band of the radio frequency spectrum. The ISM bands were typically reserved for industrial, scientific, and medical purposes (i.e. non telecommunication). However, in recent years there has been a large number of short range, low power communication systems existing within those bands.

The methodology by which wireless devices communicate can vary by device or by type of communication. For example, Bluetooth® enabled devices can pair by either legacy pairing (requiring the same PIN from each device) or secure simple pairing (a form of public key cryptography). This is commonly seen when pairing a wireless Bluetooth® enabled headset or keyboard to a Bluetooth® enabled smart phone or tablet. The prevalence of wireless communication in today's society brings about many niche markets for its use and exploitation. However, many wireless communication methods have shortcomings with relation to security concerns and various functionalities. Additionally, there is a need for a wireless pairing that enables downstream communication automatically, without user inputs. Such a wireless pairing system can be used to create large wireless groups in a short amount of time that share a common bond. Further, this interaction can be expanded upon by providing devices capable of synchronizing certain outputs and further interacting with one another within a similar short amount of time.
Review Of Related Technology U.S. Pat. No. 8,437,474 discloses a system comprised of a user and a group, wherein the group is comprised of a group leader and a group of M members where M is equal to or greater than one. The group leader generates a group public key and a group leader "master" private key. The group leader creates a personalized watermarked or decryption key, also referred to as an individual private key, for each group member. The individual private key uniquely identifies each group member. The group leader distributes the individual private keys to each of the group members. Each group member receives from a user a message encrypted using the group public key. Each of the group members uses its individual private key to decrypt the encrypted message sent by the user to the group.

U.S. Pat. No. 8,325,020 discloses methods and apparatus for uniquely identifying wireless devices in close physical proximity. When two wireless devices are brought into close proximity, one of the devices displays an optical indicator, such as a light pattern. This device then sends messages to other devices which are within wireless range to cause them to use any light sensor to detect a signal. In an embodiment, the light sensor is a camera and the detected signal is an image captured by the camera. Each device then sends data identifying what was detected back to the device displaying the pattern. By analyzing this data, the first device can determine which other device detected the indicator that it displayed and therefore determine that this device is within close physical proximity. In an example, the first device is an interactive surface arranged to identify the wireless addresses of devices which are placed on the surface.

U.S. Pat. No. 8,219,135 discloses a method for establishing a communication network that connects a group or community of users using wireless equipments according to their defined interests. These equipments are preferentially portable, low cost, and user-friendly, where each equipment must be configurable using its user's profile, which contains a small amount of the user's personal data, namely the miniprofile. The method uses a collection of such miniprofiles to transparently set a communication network among the associate users to establish a virtual community. In addition, each profile will contain further information on user's interests, which the method will propagate across the communication network to the established virtual community in a way that their members will be able to form groups based on common interests while allowing for interaction among their members. The user profile can be set identifiable or anonymous, may or not be shareable in relation to the other members of a group. The method is distributed, and supports spontaneous and volatile communication networks, preferentially.

Various devices are known in the art. However, their structure and means of operation are substantially different from the present disclosure. The devices typically require the input of a variety of data including personal information. The related devices also use inferior methodology such as cameras, which may pose security issues. The other inventions also fail to solve all the problems taught by the present disclosure. The current disclosure provides for automatic downstream pairing for devices sharing common data identifiers and methods to synchronize device outputs. At least one embodiment of this invention is presented in the drawings below and will be described in more detail herein.

SUMMARY OF THE INVENTION

The present disclosure describes and teaches a method of pairing two wireless devices having the steps of: providing a first and a second wireless device each comprising, an input channel, an output channel, a data processing unit, a non-volatile memory; and an individual identifier, the individual identifier being a unique alpha-numeric message; matching an output channel message associated with the first wireless device to the output channel message associated with the second wireless device, the matching comprising, inputting a first input message to the first wireless device, thereby associating a next one of a set of output messages with the output channel of the first wireless device, inputting the first input message to the second wireless device thereby associating the next one of the set of output messages with the output channel of the second wireless device, and repeating the step of inputting the first input message on the second wireless device until the message associated with the output channel of the second wireless device matches the message associated with the output channel of the first wireless device; generating a group identifier, the generating comprising, inputting a second input message to both the first and the second wireless devices while the first and second wireless devices are operative and within communications range, thereby causing the first and second individual identifiers and the matched output message to be operated on by a hash function, operative on the data processing unit of each of the wireless devices, to generate the group identifier; and storing the group identifier in the non-volatile memory of both the first and second wireless devices, thereby pairing the two wireless devices.

The wireless devices may operate off any number of wireless protocols, including but not limited to, Wi-Fi, ANT, ZigBee, Bluetooth®, and radio frequency identification (RFID) or any combination thereof. In order to pair the wireless devices, at least one and preferably two depressible buttons are held for at least two seconds. This provides the devices with sufficient time to receive the other's signal and perform the calculations necessary to pair the devices. Each of the devices has an individual identifier which manifests in a 64 bit number. This 64 bit number is combined with a 24 bit number stemming from the output of the wireless devices. By way of either a FNV or FNV-1a hash function, a 32 bit hash is calculated using the 64 bit and 24 bit numbers. This hash is referred to as the group identification or group ID. The group ID is stored internally in the device's non-volatile memory.

In another aspect of the invention, there is a wireless device having an external housing; a microcontroller; a radio transceiver; light emitting diode drivers operably connected to the microcontroller; a color/select button; a join/mode button; and wherein the microcontroller and LED drivers are all contained within the external housing; and wherein the color/select button and join/mode button are depressible buttons. The wireless device further has at least one red, green, blue (RGB) light emitting diodes (LEDs), a power source, a battery charger, and a micro universal serial bus (USB) jack. The device preferably operates in the 900 MHz radio frequency band, but as this is for convenience purposes, a number of other bands may be employed with equal results. The device is powered by a battery and preferably a lithium polymer battery. The device is switched between operational states using a slidable on/off switch. The microcontroller has preinstalled firmware that creates a 32 bit hash for wireless pairing in accordance with the methodology described above. The wireless device may take virtually any form and may be integrated into items of function as a stand alone system.

In another embodiment, there is a wireless device having an external housing having a top surface, a bottom surface, and at least one side surface; a coupling mechanism extending from the external housing; an embedded display in the external housing; a microcontroller; a radio transceiver operably connected to the microcontroller; at least one light emitting diode driver operably connected to the microcontroller; at least two depressible buttons operably connected to the microcontroller; and wherein the microcontroller and the at least one LED driver are contained within the external housing.

In general, the present invention succeeds in conferring the following, and others not mentioned, benefits and objectives.

It is an object of the present invention to provide a method for pairing wireless devices.

It is an object of the present invention to provide a method for automatic downstream pairing of wireless devices.

It is an object of the present invention to provide a method using hash functions to create a specific group identification.

It is an object of the present invention to provide a method of synchronizing wireless devices using visual, auditory, or tactile responses.

It is an object of the present invention to provide a wireless device that automatically detects other similarly situated devices within a predetermined proximity.

It is an object of the present invention to provide a wireless device that changes the output in response to being proximally located to another wireless device.

It is an object of the present invention to provide a wireless device and associated method that can create communicative groups of wireless devices in a short amount of time.

It is an object of the present invention to provide a method of pairing wireless devices that further permits for a synchronization of device outputs.

It is an object of the present invention to provide a social, gaming device.

DETAILED DESCRIPTION OF THE DRAWINGS

Figure 1:
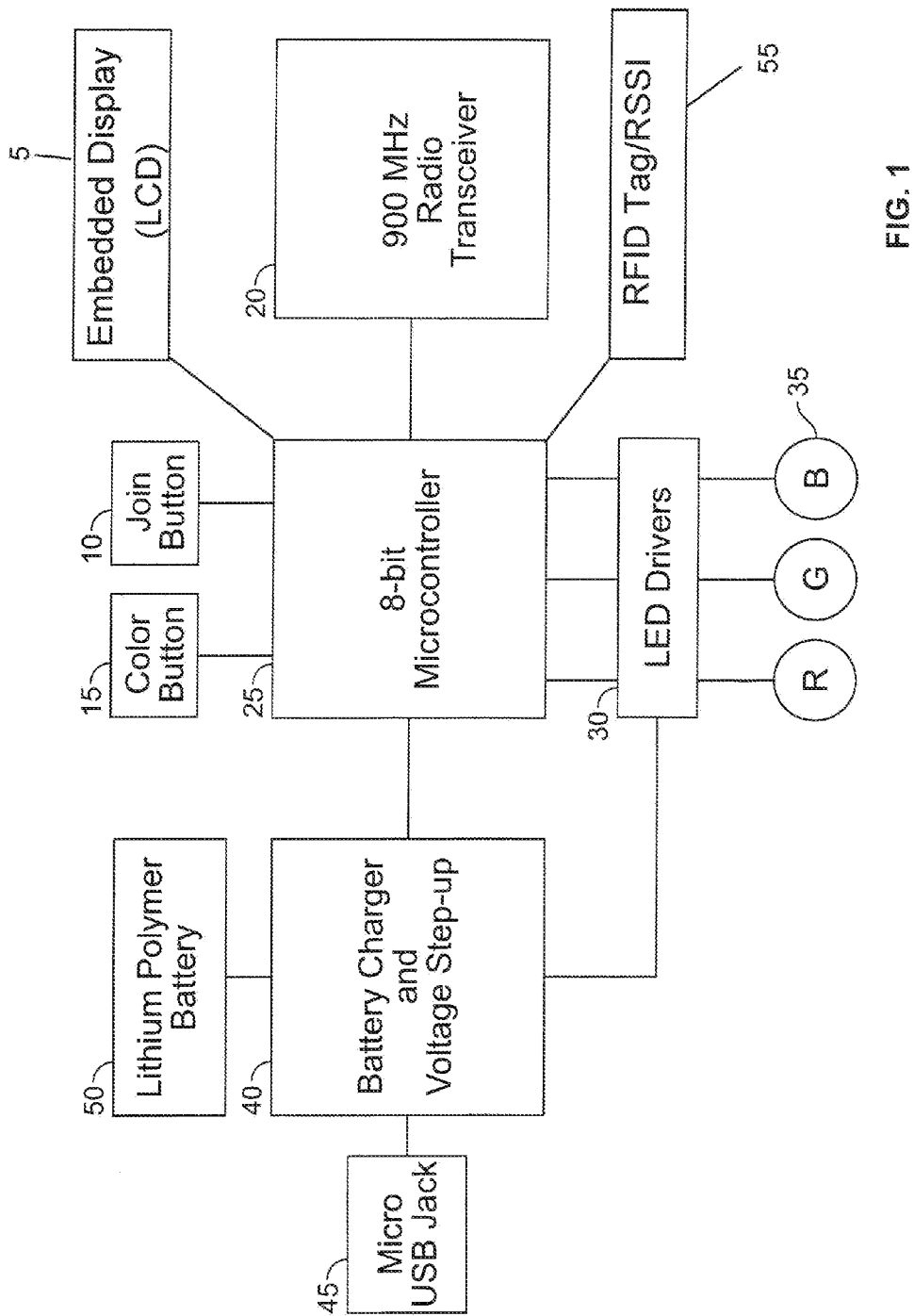
FIG. 1 is a block diagram of the components of the present invention.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

Referring to FIG. 1, there is a block diagram for the components of an embodiment of the present invention. There is a an embedded display 5 which is preferably a liquid crystal display (LCD), radio transceiver 20, join/mode button 10, color/select button 15, microcontroller 25, LED drivers 30, at least one light emitting diode (LED) 35, battery charger 40, micro universal serial bus (USB) jack 45, a battery 50, radio frequency identification (RFID) tag and/or received signal strength indicator (RSSI) 55. The radio transceiver 20 may, for instance, operate in the 900 MHz radio frequency band. This band typically operates through a range of 902-928 MHz. The radio transceiver 20 may broadcast a signal continuously unless otherwise directed. A transceiver may both broadcast and receive radio frequency (RF) signals. The radio transceiver 20 may generally operate in a broadcast mode, where every receiver can receive the data from another transmitter. It may also operate in a low-power standby mode. This may help to lengthen the life of the battery 50 between charges and may reduce interference from an abundance of devices operating in a contained area. The battery 50 is preferably a lithium polymer battery. A number of other rechargeable batteries could also be used including, but not limited to, lead-acid, nickel cadmium, nickel metal hydride, and lithium ion. Additionally, non-chargeable batteries may be used. The microcontroller 20 is preferably an 8-bit microcontroller with at least one kilobyte of non-volatile data storage. This data storage may provide for the storage of all of the wireless device's parameters. The microcontroller 20 may additionally have multiple, preferably three, pulse width modulation outputs. These may enable the device to vary the color output of the light emitting diode (LED). The microcontroller 20 may have a minimum 2.7V operational voltage and may also have a low-power standby mode.

Two depressible buttons may be connected to the microcontroller 25. These buttons, a "color/select" button 15 and a "join/mode" button 10, may cycle through various options associated with a wireless device. The buttons 10, 15 may be used singularly or may have certain functionality when used in conjunction. The micro USB jack 45 may allow for connecting the wireless device to an outside source such as, but not limited to, a laptop or electrical outlet. Depending on the connection source, the micro USB jack 45 may draw voltage to charge the battery 50 by way of the battery charger 40. Additionally, an increased voltage may be directed towards the LED driver 30. The LED driver 30 may provide a constant current source to the LED 35. The LED 35 may have red, green, blue capabilities, which when combined with the three power wave modulation outputs from the microcontroller 25, may create various light intensities and colors. The LED(s) 35 may be represented by a 24 bit number that is comprised of 8 bits of red, 8 bits of green, and 8 bits of blue. This can create an extensive list of colors, however, for practical purposes, there may only be seven (7) colors available to the wireless devices. The LED(s) 35 provide for most of the colors of the visible spectrum, including, but not limited to, red, orange, yellow, green, blue, violet, and pink, or some combination thereof.

There is preferably a liquid crystal display (LCD) 5 in operable connection with the microcontroller 25. The LCD 5 is embedded in the wireless device and is capable of producing images, animations, and colors. Using the buttons 10, 15 one may be able to navigate an menu through the LCD 5 to select varying modes, settings, and the like. The LCD 5 may vary in size and may comprise a substantial portion of the wireless device. The LCD 5 may be backlit with the LEDs 35 that permit the LCD 5 to vary in color as desired or to vary for device functionality. The RFID/RSSI 55 feature enables the wireless devices to sense when another device employing the same technology is within a predetermined proximity. This ability facilitates the interaction between the wireless devices. Preferably RFID 55 is used as it has a more extensive range than RSSI, however, the two may be used in conjunction or the RSSI may be used only. Thus, as multiple wireless devices are interacting with one another, the devices will be able to sense the presence of and proximity to another device by employing at least one of the above technologies.

Figure 2:
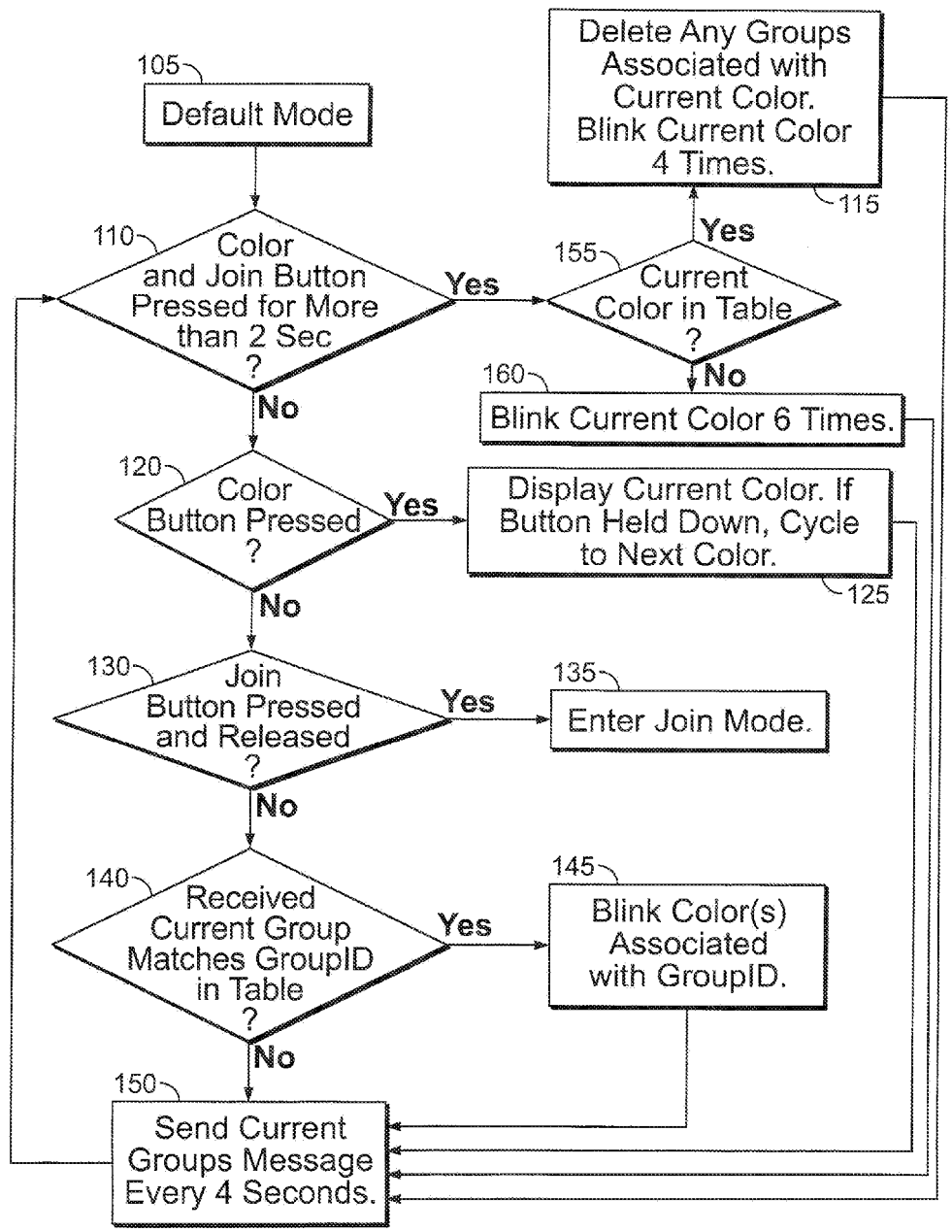
FIG. 2 is a flowchart illustrating a default operational mode of the present invention.

Referring to FIG. 2, the wireless device may initially be in a default mode 105 in which the device may be passively broadcasting a signal. In this default mode, the wireless device may, for instance, broadcast a radio frequency protocol that may be capable of being received by any other receiver configured in accordance with the present invention that is located within a predefined distance. In default mode 105, the join/mode button 10 and the color/select button 15 may be held for any amount of time, but in order to edit the data in the stored tables, the buttons may need to be depressed for at least two seconds 110. If the current color is in the table 155, and both buttons are depressed for more than two seconds, then any group associated with the current color may be deleted 115. As an indicator that this has occurred, the current color may blink a number of times, preferably four, to signify to the user that the groups that were associated with the current color may indeed have been deleted from the table. If the color is not currently stored in a table, i.e., the current color is not currently associated with a group, the current color may blink a number of times in the range of about two to ten and preferably blink six times 160. From box 115 or 160, the wireless device will thereafter send a broadcast message approximately every four seconds. If the join/mode button 10 and the color/select button 15 are not held together for at least two seconds, no action may need to be taken by the device.

The color/select button 15 may be depressed individually as shown in box 120. When the color/select button 15 is depressed, the wireless device may display the current (active) color, as indicated in box 125. If the color/select button 15 is held down for a length of time that is preferably at least one second, the wireless device may cycle to the next color in a predetermined sequence of colors. The wireless device may then begin sending a current groups message. This may be repeated periodically, preferably at time intervals of approximately four seconds 150.

Figure 3:
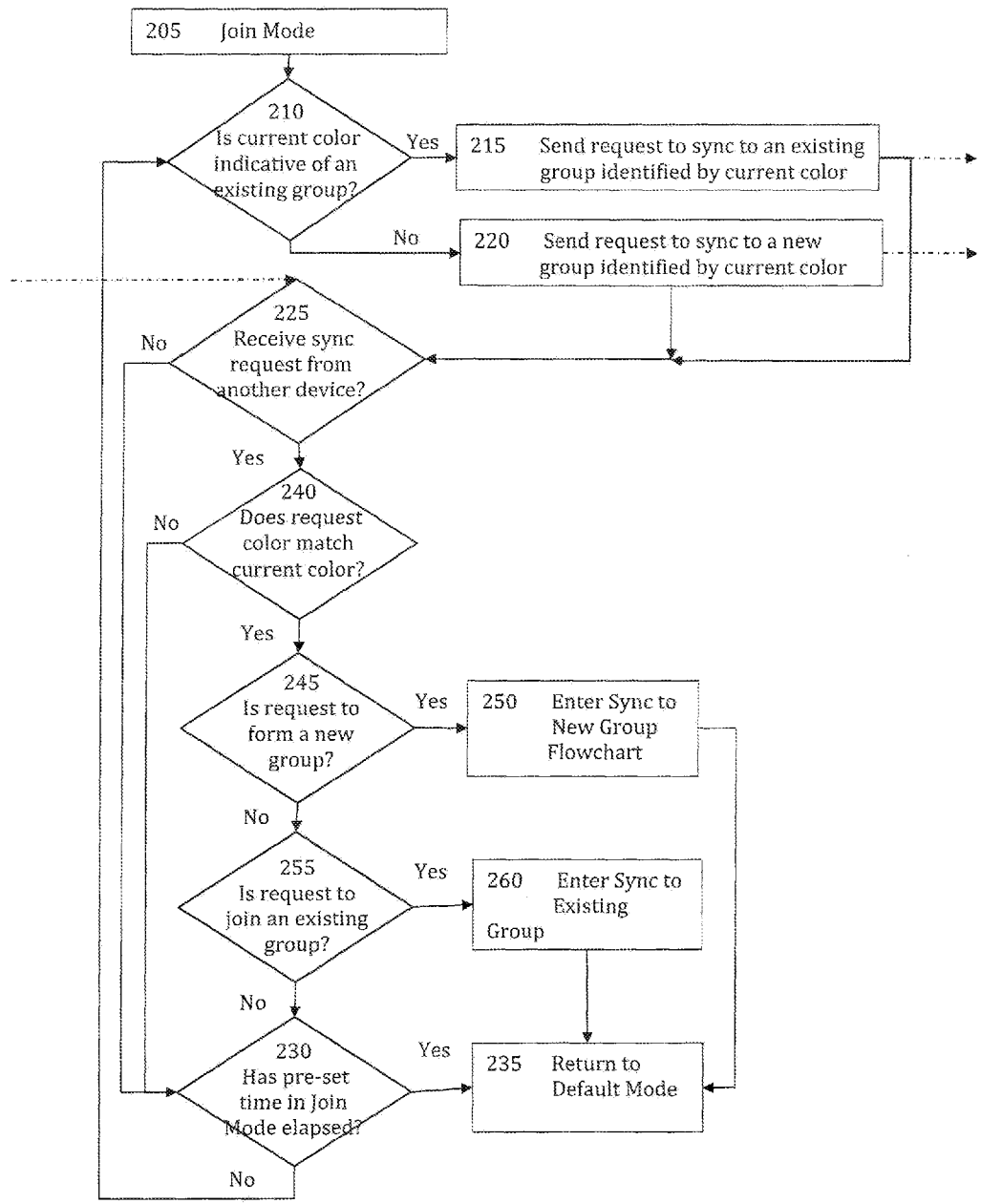
FIG. 3 is a flowchart illustrating the join mode of the present invention.

If the color/select button has not pressed in step 120, the device may then proceed to step 120 and check if the "join/mode" button 10 has been depressed and released. If the "join/mode" button 10 is depressed in step 130, a user may then enter the Join Mode in step 135. The actions that may then be taken are shown in FIG. 3 and are discussed in detail below.

The device, while broadcasting a signal, may also receive a signal at anytime. At step 140, the device may check to see if a received signal has a group ID that matches a group ID that may be stored in the Table of group IDs.

If a received signal with a group ID that matches an ID in the Table is located, then the device may proceed to step 145 and may blink the color or colors associated with that group ID using the LEDs. If more than one group ID is matched, the colors may be displayed sequentially on the LED 35.

In some instances, there may be many wireless devices within radio frequency range of on another. To minimize radio frequency interference the RF frame may include a time to live (TTL) byte. The TTL byte may, for instance, be reduced with each rebroadcast of the same group ID, until the value may reach zero. A signal with a TTL value of zero may not be rebroadcast. Thus, after a short amount of time only unique group IDs or group IDs that have a non-zero TTL byte may continue to be broadcast.

Alternatively, if there no match is found in step 140, then the device may proceed to step 150 and continue to send a signal that may contain a current group's message. This message may be repeated at a fixed time interval that is approximately four seconds. Referring to FIG. 3, there is a flow chart demonstrating the device functionality and logic within a preferred embodiment of the join mode 205. In order to enter the "join mode," the join/mode button 10 may need to be pressed and released. In an alternative embodiment, simply holding the join/mode button 10 may suffice.

Once the wireless device is in join mode 205, it may receive a message from a second wireless device.

Once the wireless device 100 has entered the join mode 205, the device may, in step 210, determine if the current color is indicative of an existing group or if it represents an attempt to form a new group.

If the current color, i.e., the one the user has chosen the device to be flashing when they entered the join mode, is indicative of an existing group that the user belongs to, then the current color will already be associated with a group ID. This association may, for instance, be stored on the user's wireless device 100 in a memory such as, but not limited to, a non-volatile memory in an associated EPROM device.

If the current color is indicative of an existing group, the wireless device 100 may then, in step 215, transmit a request for others to sync to an existing group. This existing group request may, for instance, include information such as, but not limited to, the current color and the fact that it is a request to join an existing group.

If, however, the current color is indicative of a new group, the wireless device 100 may then, instead, proceed to step 220, and may transmit a request for others to form, and sync to, a new group. This new group request may, for instance, include information such as, but not limited to, the current color and the fact that it is new group that is being attempted to be formed.

Having sent synch requests, the wireless device 100 may then proceed to step 225 and determine if it has received any sync requests from any other devices.

If no sync requests have been received, the wireless device may then proceed to step 230 to check if the device has been in the Join Mode for more than a predetermined time. In a preferred embodiment of the present invention, that predetermined mode is set at 10 seconds, though in alternate embodiments the predetermined mode may, for instance, be a time in a range from 5 to 15 seconds, or even in a range from 1 to 20 seconds.

If the preset time has not been equaled or exceeded, the wireless device 100 may return to step 210 and on to either of steps 215 or 220 in which the wireless device 100 may send a further appropriate "request to synch." The wireless device 100 may be configured such that further requests to synch are only sent a preset time after a previous request to synch. This predetermined delay of the next sync request may, for instance, help limit the amount of signal traffic in a local wireless environment. In a preferred embodiment, the predetermined delay is such that requests are only sent every 500 ms. One of ordinary skill in the art will, however, appreciate that this time may be varied dependent on the circumstances in which the device is to be used, and may, for instance, be as little as 1 ms or as long as 1 sec. There may also be circumstances in which even shorter or even longer predetermined delays are appropriate.

If, however, a synch request from another device is detected as having been received in step 225, then the wireless device 100 may proceed to step 240 and determine if the color associated with the received sync request matches the current color of the receiving wireless device.

If the colors don't match, the device may proceed to step 230 to check if the predetermined time that it is allowed to be in join mode has elapsed. If this time has elapsed, the device may proceed to step 235 and return to a default mode.

If the time has not elapsed, the device may return to step 210 and repeat the loop of sending sync requests and checking to see if synch requests have been received.

If, however, the colors do match in step 240, i.e., the color associated with the received synch request matches the current color that the user's wireless device 100 is set to, then the wireless device 100 may proceed to step 245.

In step 245, the wireless device 100 may determine if the received request is one that is intended to form a new group or not. A received request to form a new group may, for instance, be indicative of the current color not being associated with a group ID on the sender's device. This may, for instance, mean that the current color is not listed in the sender's EEPROM, or other, associated storage device, as being associated with a group ID.

If the received request is a request to form a new associated with the current color, then the wireless device 100 may proceed to step 250 and may follow the steps required in the Sync to New Group Flowchart. Having completed these steps, the wireless device 100 may proceed to step 235 and return to being in the default mode.

If, in step 255, it is determined that the received request is a request to join an existing group that may be identified by the current color, then the wireless device 100 may proceed to step 260 and may follow the steps required in the Synch to an Existing Group flowchart.

On completing the steps in the Synch to an Existing Group flowchart, the wireless device 100 may then proceed to step 235 and return to being in a default mode.

If in step 255, the request to sync is not one to join an existing group, the wireless device 100 may then proceed to step 230 to determine if a pre-set time in Join mode has been equaled or exceeded. Following this path may, for instance, be indicative of the received message to sync having an error that may, for instance, be attributable to transmission noise, or some other defect in the message.

Figure 4:
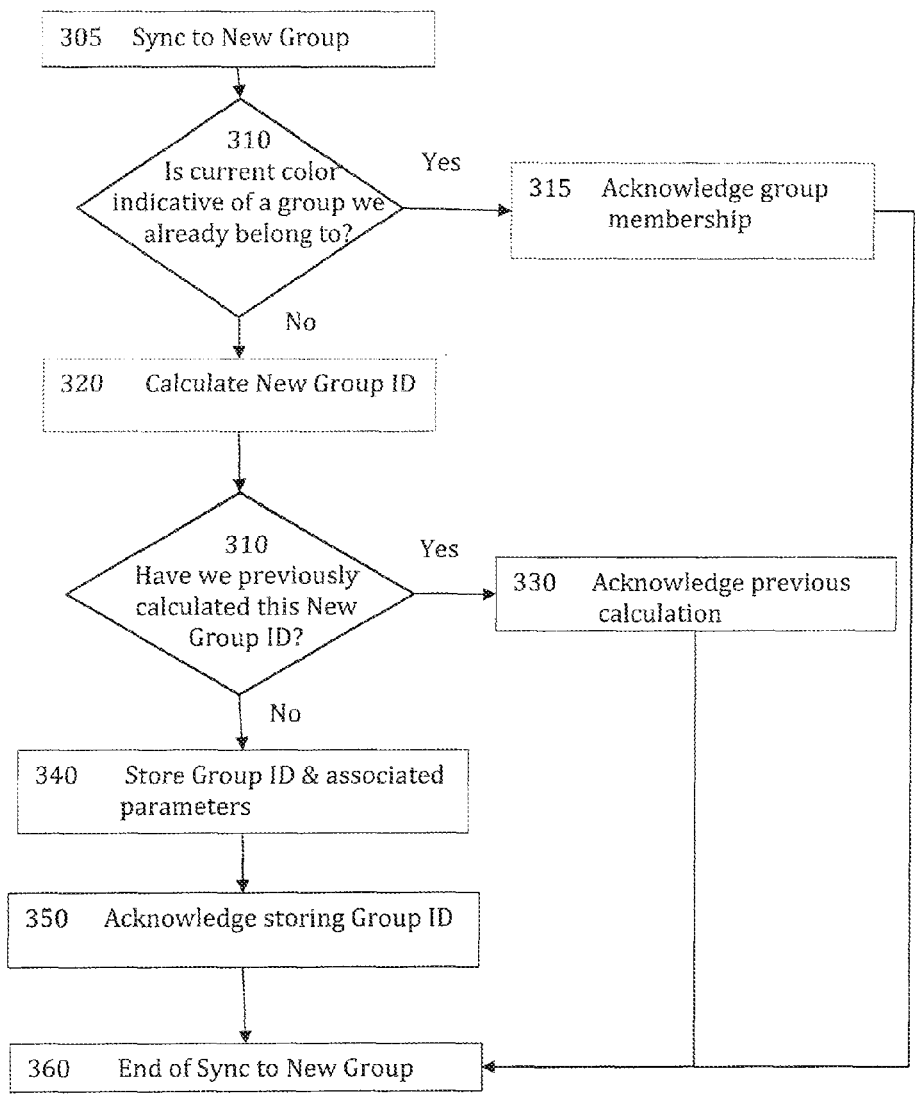
FIG. 4 is a flowchart illustrating the process to sync to a new group.

FIG. 4 is a flowchart illustrating the process to sync to a new group.

Having reached step 305 "Sync to a New Group" via one or more of the paths detailed above, the wireless device 100 may then proceed to step 310. In step 310, the receiving device may attempt to determine if the current color selected by the two devices is indicative of a group to which the receiving device already belongs. This may, for instance, accomplished by looking to see if the current color has already been associated with a group.

In a preferred embodiment of the present invention, a status table may exist in a non-volatile memory associated with the wireless device 100. This status table may, for instance, record the colors that are associated with groups, along with associated information or parameters such as, but not limited to, the group ID the color is associated with.

If in step 310, the receiving wireless device 100 determines that it already belongs to a group associated with this color, the device may proceed to step 315 and acknowledge that the device is a member of a group associated with the current color.

This acknowledgement may, for instance, take the form of using the LED display to blink on the current color a predetermined number of times. In a preferred embodiment, acknowledgement that the receiving wireless device already belongs to a group associated with the current color may be accomplished by blinking the current color a set number of times such as, but not limited to, 2 times.

If however, the receiving device determines in step 310 by, for instance, examining the status table, that it is not a member of a group identified by the current color, then the device may proceed to step 320 and calculate a new Group ID. This new Group ID may, for instance, be formed using one or more numbers that may be associated with the devices such as, but not limited to, the unique identifiers of the devices attempting to form a new group, their serial numbers, a number associated with the current color or some combination thereof. These unique identifiers may, for instance, be hashed to obtain a Group ID.

In a preferred embodiment, the new Group ID may be formed using a well-known hash function such as, but not limited to, one of the variants of the Fowler-Noll-Vo hash function. The group ID may, for instance, be created by employing the FNV-1a hash function to combine the individual identifiers from each of the wireless devices, along with an identifier associated with the common, current color displayed by the devices. This may, for instance, be accomplished by taking individual identifiers, each of which may be a 64-bit number, the color selection identifier which may be a 24-bit number, and hashing them to return a unique hash that may be a 32-bit number. This hash may function as the new Group ID.

Having calculated the new Group ID in step 320, the receiving wireless device may then proceed to step 310 to determine if this new Group ID has already been calculated. In a preferred embodiment, this may, for instance, be accomplished by examining the status, or EEPROM table, that may be stored in a non-volatile memory under the control of the EEPROM. If the newly created Group ID is already in the status table, the device may then proceed to step 330 and acknowledge that this new Group ID has been previously calculated.

This path may be included because of the possibility of non-synchronized execution of one or more steps by one or more of the devices. This check may, therefore, be necessary because of the strict peer-to-peer nature of the devices. Unlike most networks, even some that claim to be peer-to-peer, there is no single device that may be in charge. All the interactions may be accomplished by all the devices. This strict peer-to-peer networking may be a unique feature of this mode of networking.

This acknowledgement may, for instance, take the form of using the LED display to blink on the current color a predetermined number of times. In a preferred embodiment, acknowledgement that the new Group ID has already been calculated may be accomplished by blinking the current color a set number of times such as, but not limited to, 3 times.

If the new Group ID was not previously calculated, the device may then proceed to step 340 and store the Group ID and relevant associated parameters. These may, for instance, be stored in non-volatile memory associated with the device, and preferably in a readily accessible tabular format.

In a preferred embodiment of the present invention, the new group ID and the associated color may be stored in the non-volatile memory as part of the EEPROM table. In one embodiment of the present invention, the wireless devices may provide for up to sixteen (16) groups ID/color pairs to be stored in the non-volatile memory. One of ordinary skill in the art will, however, appreciate that depending on the exact technical specifications of the wireless devices many more pairs may easily be stored.

Addition data that may be stored are associated parameters such as, but not limited to, a distance (DIST) of the group ID. The DIST may, for instance, refer to an order in which wireless devices were added to a particular group ID. A DIST of 1 may be assigned to the wires devices that first form a new group ID. Then next wireless device to join may then be assigned a DIST of 2. The DIST values are preferably one byte numbers and they may, therefore, range from 1 to about 255. A DIST of 0 may be reserved for operations such as, but not limited to, testing devices.

Once the Group ID and relevant associated parameters have been stored in a non-volatile memory, the device may proceed to step 350 and acknowledge storing the group ID. This acknowledgement may, for instance, take the form of using the LED display to blink on the current color a predetermined number of times. In a preferred embodiment, acknowledgement that the new Group ID and relevant associated parameters have been stored may be accomplished by blinking the current color a set number of times such as, but not limited to, once.

Figure 5:
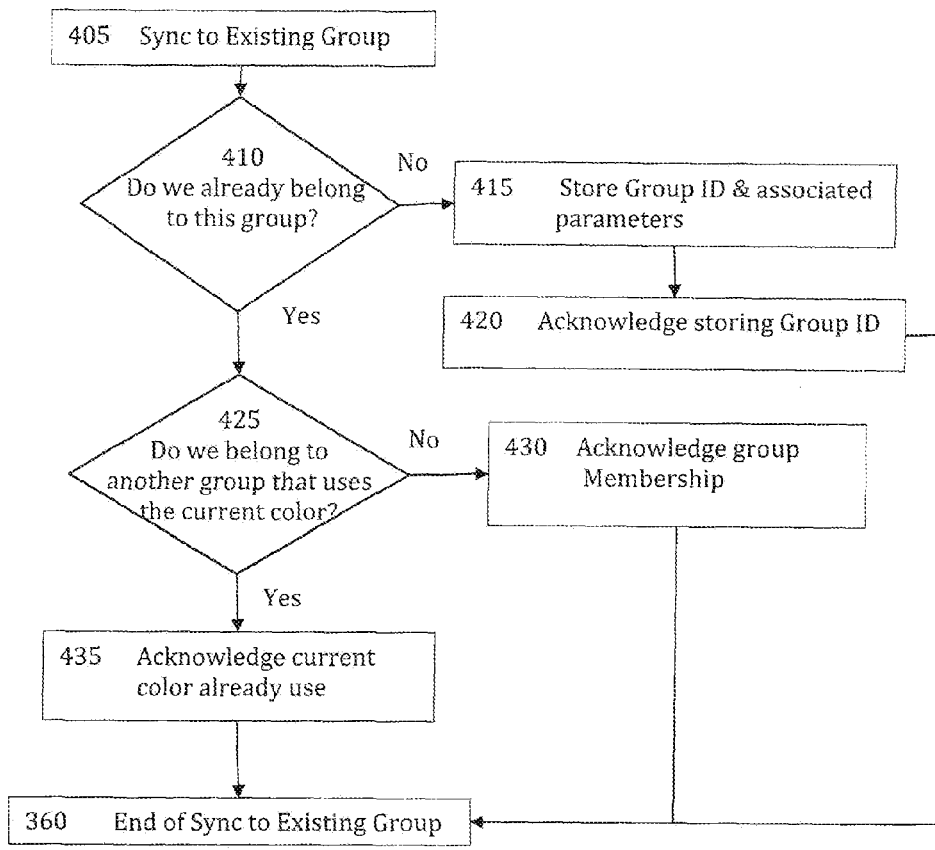
FIG. 5 is a flowchart illustrating the process to sync an existing group.

FIG. 5 is a flowchart illustrating the process to sync an existing group.

Having reached step 405 "Sync to existing group" by one of the paths detailed above, the wireless device 100 may respond to the request to sync to an existing group by proceeding to step 410 and determining whether or not the receiving device already belongs to the group it is being asked to join.

One of the elements in a request to sync to an existing group message may be the Group ID of that existing group. In order to determine if it already belongs to this group, the receiving device may access a non-volatile memory to check if this Group ID has already been recorded and associated with the current color.

In a preferred embodiment of the present invention, a status table may exist in a non-volatile memory associated with the wireless device 100. This status table may, for instance, record the group IDs the device is associated with, along with associated information or parameters such as, but not limited to, the color the Group ID is associated with.

If, in step 410, the device determines that it does not already belong to the group it is being requested to join, the device may proceed to step 415 and store the Group ID and associated parameters. This may be accomplished as described above.

Having stored the relevant data, the device may proceed to step 420 and acknowledge storing the Group ID. As detailed above, this acknowledgement may, for instance, take the form of using the LED display to blink on the current color a predetermined number of times. In a preferred embodiment, acknowledgement that the new Group ID and relevant associated parameters have been stored may be accomplished by blinking the current color a set number of times such as, but not limited to, once.

If, in step 410, the device determines that it does belong to the group it is being requested to join, the device may proceed to step 425 and determine if the device already belongs to another group that uses the current color.

This path may be included because of the possibility of non-synchronized execution of one or more steps by one or more of the devices. This check may, therefore, be necessary because of the strict peer-to-peer nature of the devices. Unlike most networks, even some that claim to be peer-to-peer, there is no single device that may be in charge. All the interactions may be accomplished by all the devices. This strict peer-to-peer networking may be a unique feature of this mode of networking.

If in step 425, the device determines that it does not already belong to another group that uses this color, the device may proceed to step 430 and acknowledge that it already belongs to the group asking it to join. This acknowledgement may, for instance, take the form of using the LED display to blink on the current color a predetermined number of times. In a preferred embodiment, acknowledgement that the receiving device already belongs to the group asking it to join may be accomplished by blinking the current color a set number of times such as, but not limited to, three times.

The wireless device may then proceed to step 360 and to the end of the sync to an existing group set of steps.

If, however, in step 425, the wireless device 100 determines that it does already belong to another group that uses the current color, the device may then proceed to step 435 and acknowledge that the receiving device already belongs to another group that uses the current color. This acknowledgement may, for instance, take the form of using the LED display to blink on the current color a predetermined number of times. In a preferred embodiment, acknowledgement that the receiving device that the receiving device already belong to another group that uses the current color may be accomplished by blinking the current color a set number of times such as, but not limited to, two times.

The wireless device may then proceed to step 360 and to the end of the sync to an existing group set of steps.

The foregoing discussion has all been in terms of "colors". One of ordinary skill in the art will, however, appreciate that such colors may act as proxies for other digital files such as, but not limited to, audio files that may contain songs, chants, phrases, slogans, images, or video clips; or may instead be actual digital files, or portions thereof, such as, but not limited to, audio files that may contain songs, chants, phrases, slogans, images, or video clips.

An exemplary such embodiment may be wireless devices 100 having a number of prerecorded songs such as, but not limited to, anthems of national soccer teams. The devices may then use the method described above to link to other wireless devices set to the same song so that, for instance, two supporters of a particular football team walking into a bar or restaurant and coming within in wireless contact of each other, may have their wireless devices both begin playing that anthem, making them realize they are in the presence of another supporter of the same team. Such devices may, for instance, be of considerable interest at international sporting events such as, but not limited to, world cup soccer and other sport tournaments, the Olympic Games and any other such events. Such devices may also be tied to advertising in the form of, for instance, sponsor jingles that accompany the anthems.

Figure 6:
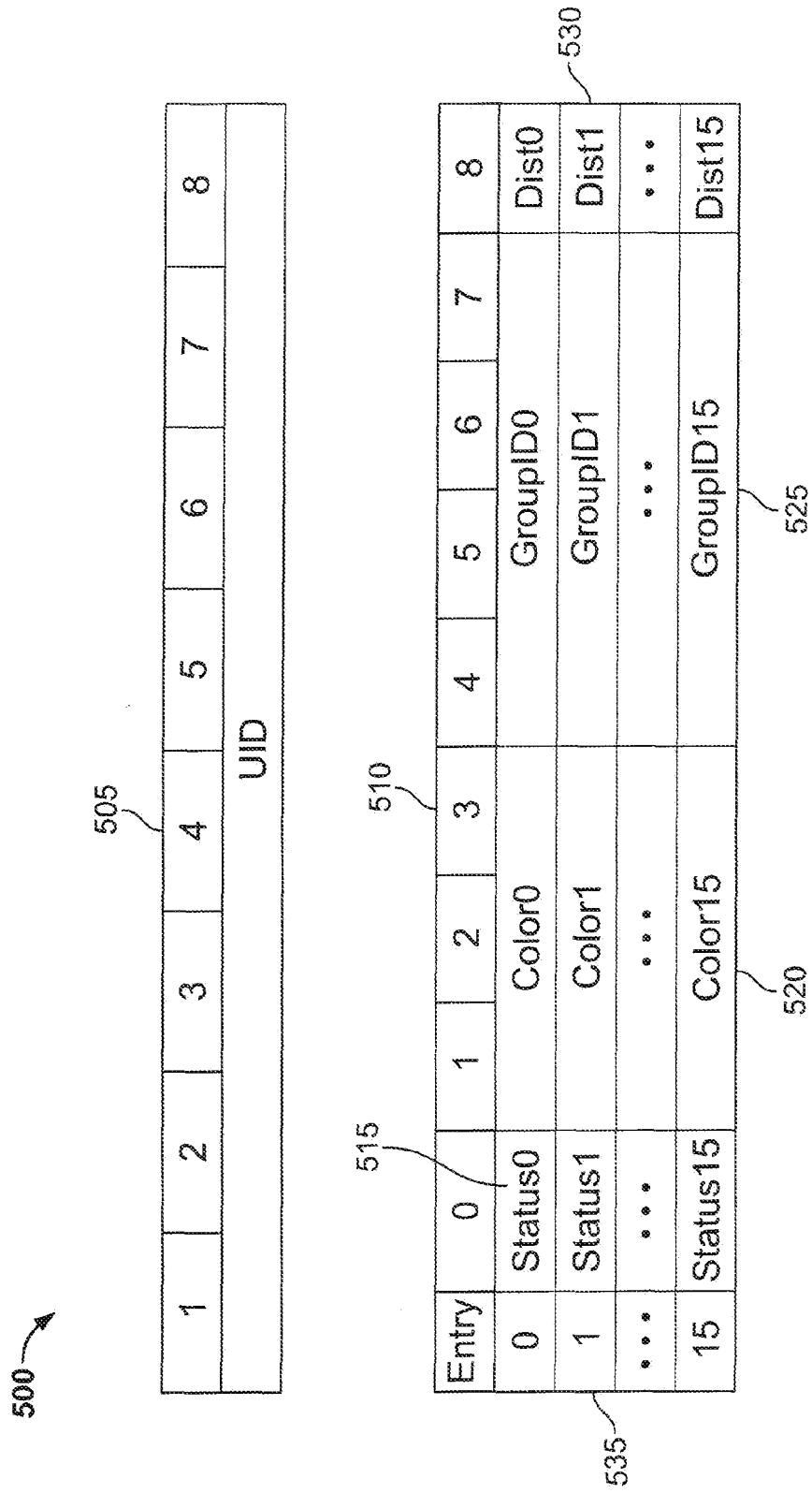
FIG. 6 is a table demonstrating the layout of the EEPROM table associated with the present invention.

In FIG. 6, there is a visual representation of the EEPROM table 500. The EEPROM table 500 may be divided into sections such as, but not limited to, the two section: 1) the individual identifier 505 and 2) the group table 510.

In a preferred embodiment, the individual identifier 505 may be a 64 bit number associated with each wireless device. The individual identifier 505 may also or instead include the serial number of the wireless device. Alternatively, the individual identifier may be a distinct factory assigned number embedded in the non-volatile memory.

Typically, the more extensive part of the EEPROM table 500 may be the second part or group table 510.

The group table 510 may, for instance, contain data such as, but not limited to, an entry number 535 that may, for instance, be a record of the order in which the entries to the table were made, a status number 515 that may, for instance, be indicative of whether this entry has a status such as, but not limited to, that it is the beginning of the table, that it is the final entry in the table, that it is an occupied entry row, that it is a deleted entry row, or some combination thereof. The group table may further include number that may represent, or be, a color number 520, a group ID 525 or a DIST number 530 or some combination thereof.

In a preferred embodiment of the present invention, the entry 535 may signify the order in which an individual entry in the EEPROM table 500 was entered. The EEPROM table 500 preferably provides for using two bits and therefore representing entry numbers from 0-15. However, in practice, the entry number 535 of 0 is typically unused since this location in a non-volatile memory may experience corruptions if the user allows the battery voltage to drop below a certain level before replacing or charging the battery 50.

The color number 520 may, for instance, be one of up to 16 colors, though one of ordinary skill in the art will appreciate that the possible number of colors used may depend on the number of bits used to store the number and the amount of non-volatile memory available. The color number 520 may, for instance, represent the current color in a 24 bit format RGB format that may have 8 bits to represent the percentage of red, 8 bits to represent the percentage of green, and 8 bits to represent the percentage of blue. Each color 520 may be associated with a particular entry 535 by, for instance, being in an associated row or column.

The group ID 525 may also be stored in the EEPROM table and may be associated with a particular color. This may, for instance, be accomplished by storing a group ID on the same line as its associated color 520. The group ID may be a number. In a preferred embodiment, the group ID may be a 32 bit hash that results from the combination of the individual identifier 505 of one wireless device combined with the same from another wireless device, and the associated 24 bit color 520. The resulting hash may be stored as the group ID 525 in the EEPROM table 500.

The DIST 530 may be a measure of the distance that separates a particular entry 535 from the original two creators of the associated group ID 525. In a preferred embodiment, the DIST 530 may range from 1-255 although one of ordinary skill in the art will appreciate that the range could be larger or smaller and may depend on the number of bits assigned to represent it, and on the amount of non-volatile memory available to store it. A DIST 530 of 0 may be reserved for purposes such as, but not limited to, testing.

The status 515 may keep track of information associated with each entry 535. The status 515 may, for instance, identify a history of each entry such as, but not limited to, whether it is occupied, deleted, the first entry in the table, the last entry in the table or some combination thereof. The status 515 may also or instead aid in keeping track of the overall size and usage of the EEPROM table 500.

Typically, the wireless devices may join groups based on the individual identifiers and colors.

In a further preferred embodiment of the invention, the wireless devices may also provide for phase synchronization between the devices. Each broadcast message may, for instance, be contain a phase accumulator that may be a 12 bit phase accumulator. Each device may also have a 16 bit phase increment value associated with it that may be in a format such as, but not limited to, a 1.15 format. At predetermined intervals, such as, but not limited to, approximately every 1 ms, the phase increment may be added to the phase accumulator. The phase accumulator may represent the instantaneous phase of the wireless device. When a packet for the "current group" is received the difference between the received phase and the transmitted phase may be recorded in the EEPROM table 500. These difference values may be compared by, for instance, processing them with a clustering algorithm to create an average difference value. This average difference value may then be used to adjust the instantaneous phase of the phase accumulator. In this manner two or more wireless devices that may belong to the same group, may each develop phase accumulator values that more closely match each other over time.

This phase accumulator value may, for instance, be used to provide synchronization of the LED 35 blinking patterns. In a preferred embodiment, the period for LED 35 synchronization may be about four seconds. The "current groups" message may also be sent approximately every four seconds. As the convergence rate for the algorithm may typically be about 11 messages, the convergence time may be about 44 seconds.

Figure 7A:
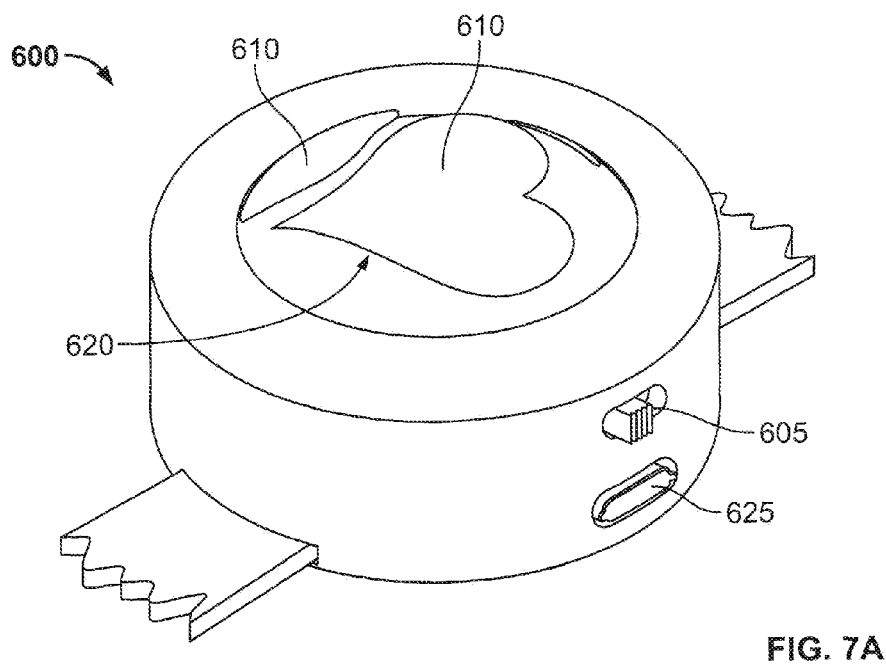
FIG. 7A is a front perspective view of an embodiment of the present invention.

FIG. 7A shows a perspective view of an embodiment of the wireless device 100 of the present invention.

Figure 7B:
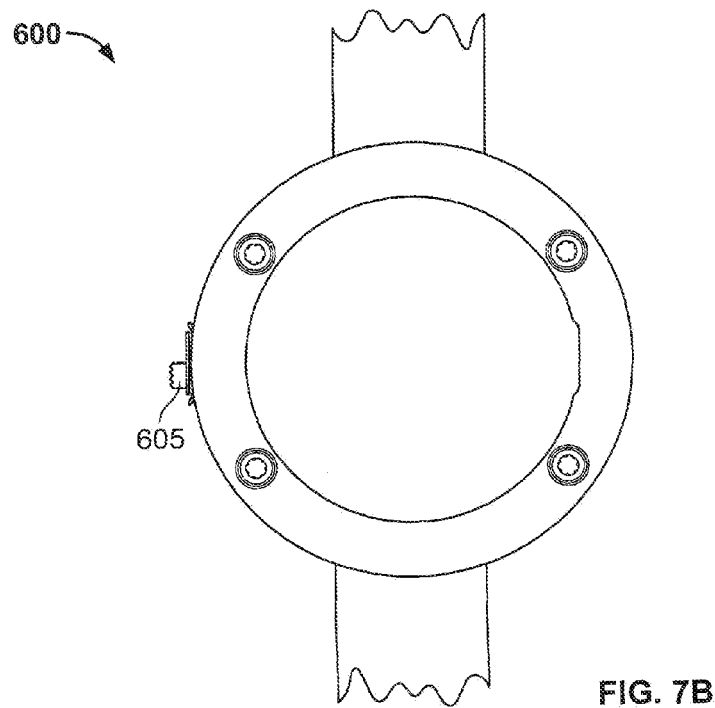
FIG. 7B is a bottom view of an embodiment of the present invention.

FIG. 7B shows a plan view of the embodiment shown in FIG. 7A.

In FIGS. 7A and 7B, the wireless device 100 may have a housing 600 that contains the internal components. These internal components may, for instance, include a power source that may, for instance, be a battery, one or more printed circuit boards, preinstalled firmware, and a transceiver. The shape of the housing 600 may be varied to conform to the intended use and purpose for which the invention is being employed.

The housing 600 may also serve as a platform for one or more external components. The external components of the wireless device 100 may include one or more depressible buttons 610 that may be used to initiate interactions or respond to requests from other similar devices.

In some instances, the power source may be rechargeable, and this may be facilitated by one or more charging ports 625. The charging port 625 may permit connection to a number of different devices including wall outlets and laptop computers through a USB connection to charge the internal power source. In order to further preserve the device's power source there may also a slidable on/off switch 605. The slidable on/off switch 605 may change the operative state of the device and may have more than two states. The output 620 may take a number of forms. These may include auditory, visual, or tactile responses or some combination thereof. These alternate outputs may be facilitated by attached devices such as, but not limited to, an audio speaker, a video screen or some combination thereof.

In a preferred embodiment, the output 620 may be an LED that may, for instance, be located under one of the depressible buttons 610. The position of the output 620 may be varied and may be located independent of the depressible buttons 610 or other features of the device. The outputs 620 may also include combinations of responses including a response that is both auditory and visual in nature. In a preferred embodiment, the wireless device 100 may have a housing 600 with an attached ring that may be sized to appropriately fit around a variety of objects such as, but not limited to, a user's wrist. The device may, for instance, be worn or attached to another item such as, but not limited to, a backpack or a hat for a customized enhancement. The wireless device may take a number of differing shapes and sizes to fit a number of applications.

The wireless device 100 may be contained on or within the housing 600 which may be worn directly, or it may be a part of a more complex system that may, for instance, be include wireless communication with other display or sound producing devices such as, but not limited to, a television, a laptop computer, a smartphone, a pad, or some combination thereof. These auxiliary devices may, for instance, be used to augment the display or auditory aspects of the devices. Instead of, or in addition to, blinking LED lights, group recognition may, for instance, be used to initiate an action such as, but not limited to, the playing of a song, a portion of a song or a slogan; the display of an image or a video clip, or some combination thereof.

Figure 8:
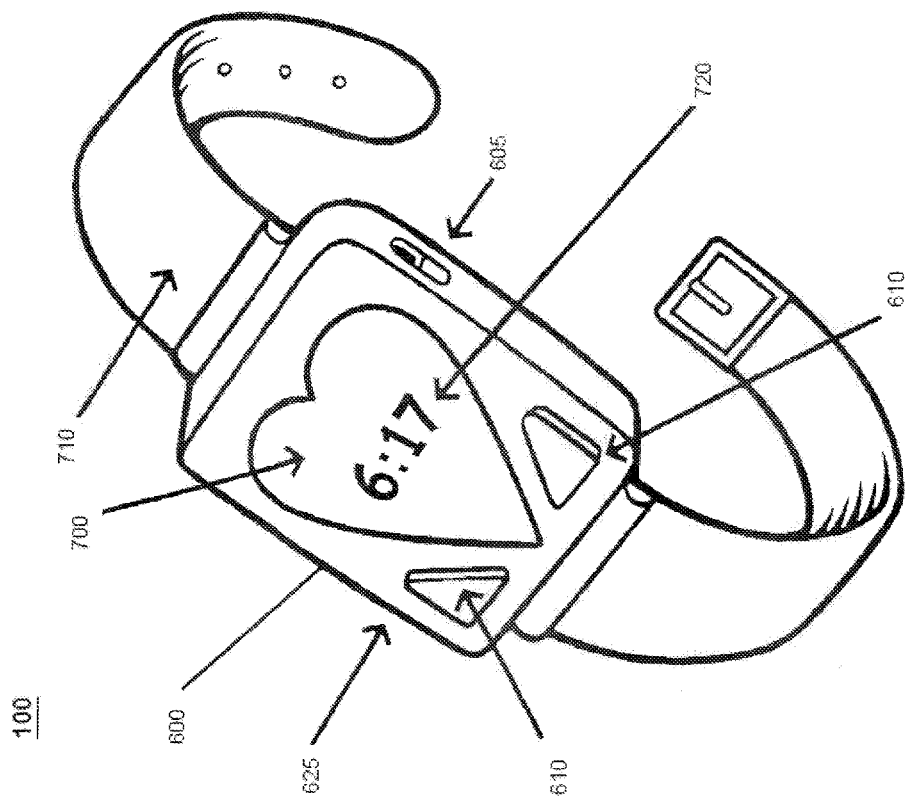
FIG. 8 is a front perspective view of an alternate embodiment of the present invention.

FIG. 8 shows a perspective view of an alternate embodiment of the present invention. The wireless device 100 has a housing 600. The housing 600 has at least two depressible buttons 610. The depressible buttons 610 bear varying functionality including a color output selection, game selection, synchronization, and mode selection. The exact function can vary between depressible buttons 610 and some buttons 610 may have multiple functionality. The housing 600 further has an embedded display 700, which is preferably a liquid crystal display. The embedded display 700 can display various colors, images, and animations or a combination thereof. When not actively being used the embedded display 700 should display the time 720. A power switch 605 is located on a portion of the housing that changes the operative state of the wireless device 100. If, and when the wireless device 100, needs to be recharged there is a universal serial bus port 625 that can be employed for such purpose.

A coupling mechanism 710 is used to secure the wireless device 100 to a secondary body including but not limited to a backpack, hat, shoe, glove, or wrist. The coupling mechanism 710 and embedded display 700 may each have the same lighting output or have differing lighting outputs or no lighting capabilities at all. It may be desirable to have such lighting flash in synchronization.

A user can interact with the wireless device 100 in a number of ways. Generally, the wireless device 100 can function as a watch or ornamental piece when passively adorning a secondary body. During this passive "mode" the lighting outputs may or may not be active. When actively be used and interacted with, the wireless device 100 can become a social gaming device. A user is able to select various games that come installed in the preinstalled firmware. Additionally, via the universal serial bus port 625, more games may be downloaded from the internet. In some instances, this downloading will require a nominal fee. The games are based on the methodologies and capabilities described above.

In order to select one of the game features a user uses one of the depressible buttons 610 to select the game mode. From there a menu of games can be accessed through the embedded display 700 and selected using the depressible buttons 610. Once a game has been selected, instructions may appear on the embedded display 700 and the device may perform certain functionalities such as automatically dividing players into various groups or teams, assigning a player a partner, and dividing players based on those who are located in the general vicinity. The games can be played with groups of players or some games may be able to be played by solo players. The RFID and/or RSSI functionality as discussed above is integral to the success of many of the games associated with the wireless devices 100. This enables a number of wireless devices 100 to know, spatially, where any other device is in proximity to a particular device. Thus, games like "tag" and any other proximity based games will operate as described below with such functionality. Further, based on the device's understanding of the other proximally located devices, the wireless devices 100 can also randomly divide players on to a particular team instantaneous, removing the traditional playground alternate teammate picking format. Examples of various interactive multiplayer games include:

"Zombie Tag." The players select "zombie tag" from their on screen menu. Once the game has been selected, a countdown timer or start button will start the game. One player's wireless device 100 will begin to blink in a particular color, for example, red. The remaining players will have wireless devices blinking a unitary color, for example, green. The player whose wireless device 100 is blinking red begins to chase the players whose wireless devices 100 are blinking green. Once the player with the red blinking wireless device 100 comes within the predetermined range of another player, as determined by the included RFID and/or RSSI capabilities, their wireless device 100 begins blinking red instead of green. That player has now become "infected" and helps the other red team members chase the green team members. The last remaining player with a green blinking wireless device 100 wins.

"The Perfect Wave." The players select "the perfect wave" from their on screen menu. Each of the wireless devices 100 then begins intermittently blinking, while a timer begins counting down to zero on the embedded display 700. Each of the players has to organize themselves in a circle based on the timing of their blinking wireless device 100. In order to win, the blinking of the lights must be coordinated to travel around the circle in a continuous wave before the timer reaches zero. The wireless devices 100 automatically understand where each player is in relation to another and at what interval the other lights are blinking.

"Human Twister." The players select "human twister" from their on screen menu and the game begins. The wireless devices 100 begin by blinking several colors, where each of the players with the same blinking color must touch one another. All of the sudden, the blinking lights change color. Quickly, everyone must now touch someone blinking the new color while remaining in contact with the previous player. A timer may countdown on the embedded display 700 as to the amount of time a player has to make a new contact. The game is over when someone loses their balance and falls or someone fails to touch a new contact within the prescribed time limit.

"Red Light, Green Light." The players select "red light, green light" from their on screen menus. The players determine the start point and the end point to which people must run from and to. When your wireless device 100 turns green, you begin to run. If it turns yellow, you must walk. If the wireless device 100 turns red, you must stop moving.

The first player to reach the end point wins.

"Human Tic-Tac-Toe." The players select "human tic-tac-toe" from their on screen menus. The embedded display 700 has a timer which counts down to zero as the wireless devices 100 generate random colors. Players with the same color must be in proximity, as determined by the wireless devices 100, to one another to have three matching colors in a row before the timer reaches zero.

"Freeze Tag." The players select "freeze tag" from their on screen menus. The game begins with a number of players having their wireless device 100 display one color, while at least one player has a different color. The player(s) with the different color attempt to chase the others and get close enough to cause their wireless device 100 to display the "other" color. This player must then stop and cannot run. Another player must come into proximity, as determined by the wireless device 100, to allow the wireless device 100 to change colors allow the player to begin running again. The game ends with every player bearing one color, or the timer reaching zero.

The above games are only meant to be representative of the types of games that can be played with multiple players employing the wireless device 100. Virtually any game that enables the game play of more than one player may be envisioned to be compatible with the present invention. Additionally, some games may be able to be played by only one player known as solitaire games.

"Solitaire Color Grab." The player selects "solitaire color grab" from their on screen menu. The embedded display 700 shows the player the "target color." The player's embedded display 700 then begins rapidly blinking in a number of different colors including the target color. The player attempts to depress one of the depressible buttons 610 when the target color is displayed. If the player is correct, the player receives a point. The game play can continue until they have reached a certain amount of points or they decide to quit.

"Pattern Solitaire." The player selects "pattern solitaire" form their on screen menu. The player's wireless device 100 begins to blink in a series of colors. As quickly as it started, the blinking stops. The player must then select the next color in the pattern. The player may be able to increase or decrease the difficulty level or adjust the number correct needed to win the game.

"Solitaire Mastermind." The player selects "solitaire mastermind" from their on screen menu. The wireless device 100 is "thinking" of a selected number of colors, for example three different colors. The player attempts to guess the colors and the order of the color pattern. By selecting a color, the wireless device 100, via the embedded display 700, informs the player whether the color is correct and whether the guessed position of the color in the sequence is correct. Once the player has correctly deduced the sequence the game is over. To challenge themselves, the player may limit the amount of guesses they are afforded before the game is over.

The above games are only meant to be representative of the types of games that can be played with a single player employing the wireless device 100. Virtually any game that enables the game play of one player may be envisioned to be compatible with the present invention.

Figure 9:
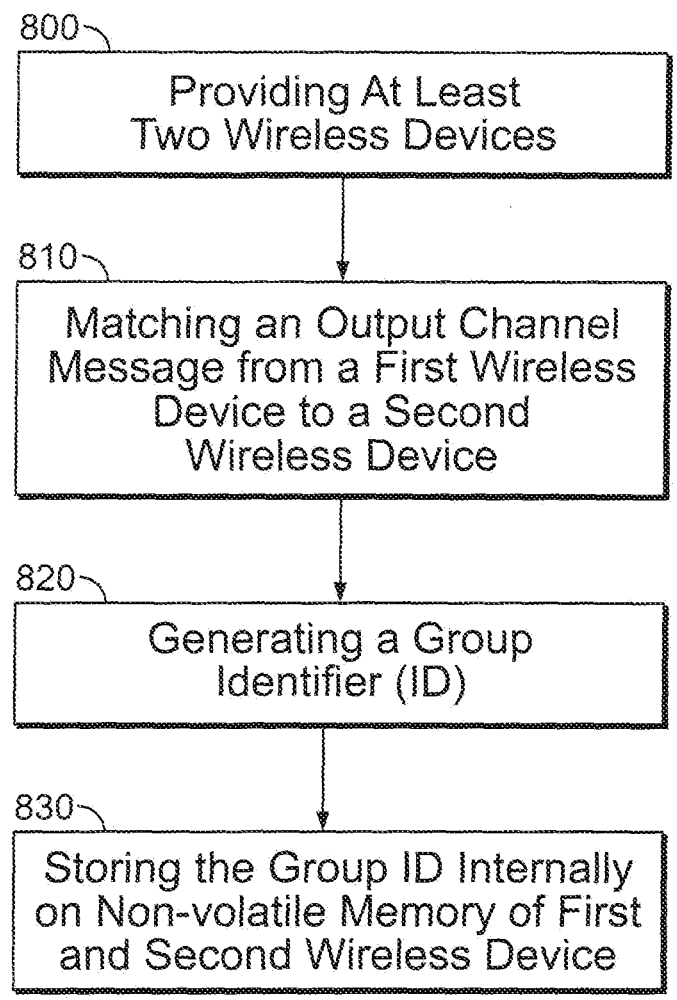
FIG. 9 is a flowchart illustrating the general methodology of the present invention.

FIG. 9 shows one embodiment of the general methodology associated with pairing wireless devices. A user or users may first provide at least two wireless devices 800. The wireless devices may be all be the same or there may be a number of different but compatible wireless devices that may have differing capabilities. Typically each wireless device may have an input channel, an output channel, a data processing unit, a non-volatile memory, and an individual identifier that is unique to each wireless device.

The pairing methodology may continue by matching an output channel message associated with the one of the wireless devices to the output channel message associated with a second wireless device 810. This may be achieved by inputting a first input message to a wireless device. This, in turn, may associate a next of a set of output messages with the output channel of that wireless device. The process may then be replicated on a second wireless device. This process, may be repeated until the message associated with the output channel of the second wireless device matches the message associated with the output of the first wireless device.

Third, this inputting of messages may result in the generation of a group identifier 820. The generation process may, for instance, be include inputting a second message to both the first and the second wireless devices while the two wireless devices are operative and within a communicative range with one another. The proximal placing of the devices within this range may cause the individual identifiers associated with each wireless device and the previously matched output message to be operated on by a hash function. This hashing of identifiers may, for instance, be performed by a data processing unit that may be a part of each of the wireless devices thereby generating the group identifier.

Finally, the devices may conclude the process by storing the newly acquired data 830. The group identifier and other potential identifying information may, for instance, be stored in a device's non-volatile memory. This information may be stored within an EEPROM table for easy sorting and maintenance of the data. This storing step 830 may finalize the pairing process.

While much of the focus of the pairing of the wireless devices has focused on the color output from each device, it is intended and would be readily appreciated by those skilled in the art that there are many outputs that could be used in place of colors. For example, the wireless devices may have an output comprising any auditory, visual, or tactile response including various methods of haptic (tactile) feedback. Thus, two wireless devices may be paired through the above described process using a ringtone or similar short musical tone(s). In some iterations, the devices will be capable of having multiple LEDs that work on conjunction to form images or particular responses such as shifting images when two paired items are brought within a working, communicative range. The inherent functionality of the device does not change and numerous iterations can be employed using the same data processing methodologies.

Additionally, the wireless devices may be a part of items such as, but not limited to, bracelets, wristbands, watches, clothing items such as hats, shirts, and shoes, electronic items such as phones, tablets, laptops, PDAs, and the like, and other accessories including but not limited to glasses, sunglasses, backpacks, headphones, or some combination thereof.

The communications range of the wireless device 100 may vary depending on factors such as, but not limited to, the particular wireless communication protocol used, the hardware available, the environment they are used in or some combination thereof. Depending on the final form and intended usage of the devices, some protocol stacks may be preferred over others. For example, some may permit the wireless devices to have a greater range, but a shorter battery life.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of pairing two wireless devices comprising:
    providing a first and a second wireless device each comprising,
        an input channel;
        an output channel;
        a data processing unit;
        a non-volatile memory; and
        an individual identifier, the individual identifier being a unique alpha-numeric message;
    matching an output channel message associated with the first wireless device to the output channel message associated with the second wireless device, the matching comprising,
        inputting a first input message to the first wireless device, thereby associating a next one of a set of output messages with the output channel of the first wireless device;
        inputting the first input message to the second wireless device thereby associating the next one of the set of output messages with the output channel of the second wireless device; and
        repeating the step of inputting the first input message on the second wireless device until the message associated with the output channel of the second wireless device matches the message associated with the output channel of the first wireless device;
    generating a group identifier, the generating comprising,
        inputting a second input message to both the first and the second wireless devices while the first and second wireless devices are operative and within communications range, thereby causing the first and second individual identifiers and the matched output message to be operated on by a hash function, operative on the data processing unit of each of the wireless devices, to generate the group identifier; and
    storing the group identifier in the non-volatile memory of both the first and second wireless devices, thereby pairing the two wireless devices.

2. The method of claim 1 wherein the hash function generates a unique group identifier.

3. The method of claim 2 wherein the hash function is a FNV hash function.

4. The method of claim 2 wherein the hash function is a FNV-1a hash function.

5. The method of claim 1 wherein the wireless pairing is achieved using at least one wireless communication protocol.

6. The method of claim 1 wherein the group identification is a 32 bit hash.

7. The method of claim 1 further comprising the step of:
    automatically pairing two unpaired wireless devices that share the same group identification,
        wherein pairing automatically occurs when the two unpaired wireless devices are brought within a predetermined range of one another.

8. The method of claim 1 further comprising the step of:
    synchronizing an output of the wireless device with other wireless devices sharing the same group identification.

9. The method of claim 8 wherein the output is a visual, auditory, or tactile response, or any combination thereof.

10. The method of claim 1 wherein the individual identifier is a 64 bit number.

11. A method of pairing two wireless devices comprising:
    providing a first and a second wireless device each comprising,
        an input channel;
        an output channel;
        a data processing unit;
        a non-volatile memory; and
        an individual identifier, the individual identifier being a unique alpha-numeric message;
    matching an output channel message associated with the first wireless device to the output channel message associated with the second wireless device, the matching comprising,
        inputting a first input message to the first wireless device, thereby associating a next one of a set of output messages with the output channel of the first wireless device;
        inputting the first input message to the second wireless device thereby associating the next one of the set of output messages with the output channel of the second wireless device; and
        repeating the step of inputting the first input message on the second wireless device until the message associated with the output channel of the second wireless device matches the message associated with the output channel of the first wireless device;

generating a group identifier, the generating comprising,
 inputting a second input message to both the first and the second wireless devices while the first and second wireless devices are operative and within communications range, thereby causing the first and second individual identifiers and the matched output message to be operated on by a hash function, operative on the data processing unit of each of the wireless devices, to generate the group identifier; and
storing the group identifier in the non-volatile memory of both the first and second wireless devices, thereby pairing the two wireless devices;
automatically pairing two unpaired wireless devices that share the same group identification,
 wherein the pairing automatically occurs when the two unpaired wireless devices are brought within a predetermined range of one another; and
synchronizing an output of the wireless device with other wireless devices sharing the same group identification.

* * * * *